Patented June 8, 1948

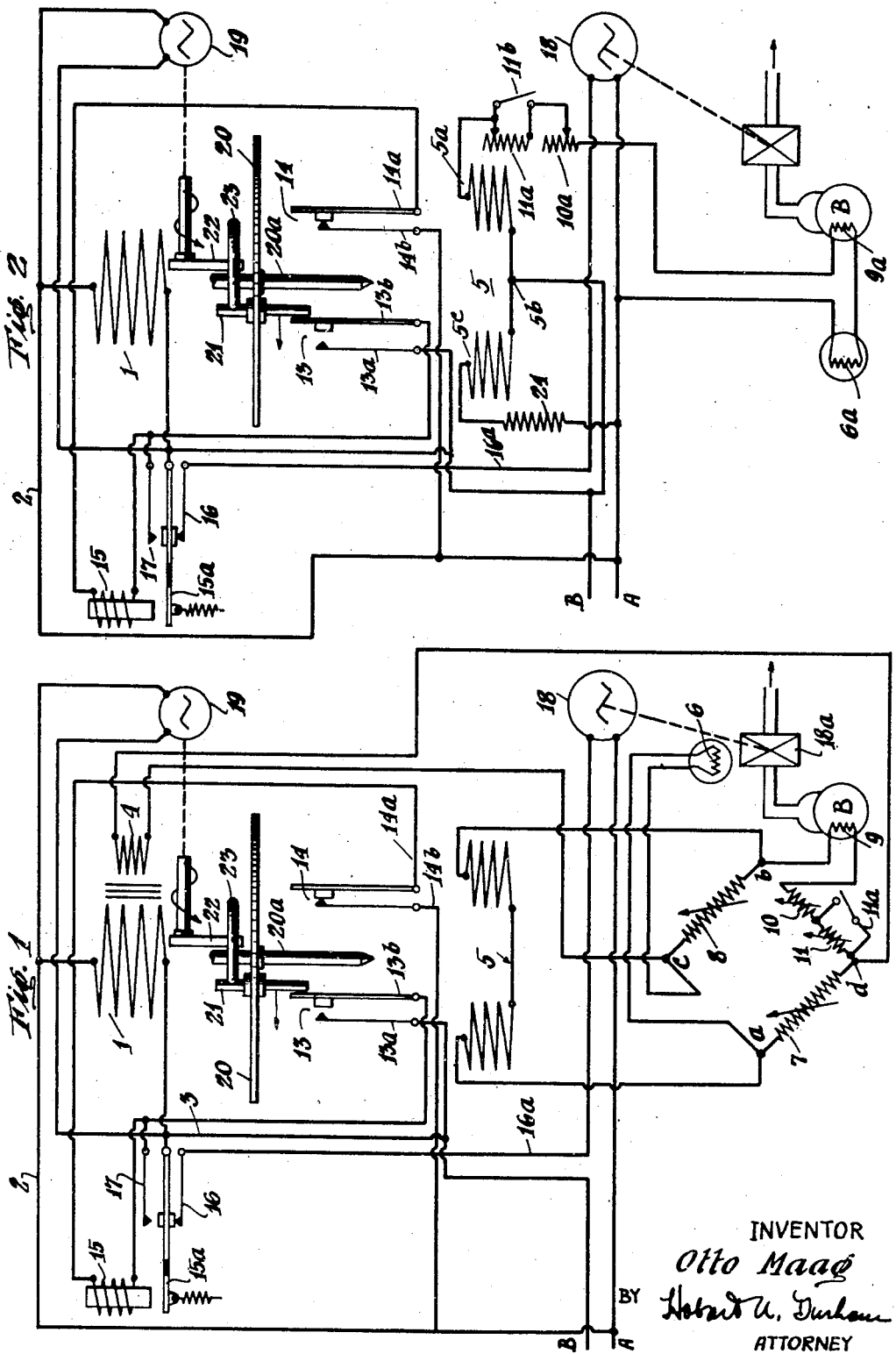

2,442,819

UNITED STATES PATENT OFFICE 2,442,819

CONTROL SYSTEM

Otto Maag, Zug, Switzerland, assignor to Landis & Gyr A. G., a body corporate of Switzerland Application August 5, 1943, Serial No. 497,512
In Switzerland August 13, 1942

5 Claims. (Cl. 236—70)

The present invention relates to a control system for controlling loads in accordance with such physical changes incident to the generation of heat, pressure, tension and the like.

Control systems whose operation is a function of some physical value are well known and are generally connected to a circuit having a bridge or differential characteristic. In all such systems, control is exercised by virtue of control pulses between the control system as a sender and a load to be controlled as a receiver. In order to take advantage of such control impulses for use in a load, various means for amplification such as relays may be provided. Thus, such relays may be of various types such as watt meters, and various kinds of electronic devices. As a rule, however, control systems are apt to be rather expensive. This is particularly true if a calibrated control system is required, in which case calibration at the place of use may be necessary.

The present invention relates to a control system which is simple and has great sensitivity. It is particularly satisfactory for use in places where a simple and cheap installation is required. The invention is characterized by the use of a Ferraris watt meter type of relay in a bridge system to function as a control.

The annexed drawing and the following description set forth in detail certain temperature regulating systems for heating purposes illustrating the invention, such disclosed means constituting but two of various other forms in which the principle of the invention may be used.

Figure 1 is a diagrammatic representation of one form of system embodying the invention, and Figure 2 shows a modified system.

Referring first to Figure 1, a Ferraris watt meter used as a control element may have voltage coil 1 connected to lead 2 going to line wire A supplied with alternating current at usual frequency. Coil 1 has its other terminal connected to lead 3 going to line B.

The system is connected in the form of a Wheatstone bridge having terminals c and d connected by wires to winding 4 functioning as a secondary of a transformer whose primary is winding 1. The other two terminals of the bridge are indicated as a and b. Across terminals a and b are connected current coils 5 of the Ferraris instrument. Between points a and c of the bridge is an arm consisting of temperature responsive resistance 6, which may for example be responsive to some outside temperature. Variable resistance 7 is connected between points a and d of the bridge to form another arm. Variable resistance 8 may be connected between points b and c to form a third arm. The fourth arm of the bridge between b and d consists of resistances 9, 10, and 11 in series.

Resistance 9 may be a temperature responsive element within a boiler. Resistance 10 is variable and is provided for balancing purposes, while variable resistance 11 may have switch 11a shunted across so that a night setting for the system may be provided. Thus, with switch 11a open, one bridge balance point will exist and, with the switch closed, another switch balance point will exist, these two points being respectively day and night temperatures to be maintained.

The Ferraris instrument is adapted to control two sets of switches 13 and 14. Thus, switch 13 has leads 13a and 13b connected thereto. Lead 13a is connected to lead 3 going to line wire B. Lead 13b is connected by wire to relay winding 15, whose other terminal is connected by lead 14a to one contact of switch 14. The other contact of switch 14 is connected by lead 14b back to wire 2. Relay 15 has contacts 16 and 17 controlled by movable contact member 15a. Contact 16 is connected by wire 16a to one terminal of motor 18. The other terminal of motor 18 may be connected directly to line wire A. Motor 18 represents a load and may be connected to valve 18a controlling the operation in the boiler. Relay contact 17 is connected to wire 13b, while movable contact 15a is connected to lead 3.

Synchronous motor 19 may be connected to leads 2 and 3 and thus runs continuously. Motor 19 periodically turns crank arm 22 bearing roller 23 at its end, said crank arm turning in a plane perpendicular to the plane of the drawing. The Ferraris instrument has usual disc 20 mounted for rotation on shaft 20a and carrying eccentrically pin 21.

Pin 21 extends a distance below disc 20 and is adapted to cooperate with switches 13 or 14 to change their position. As is clearly evident, switch 13 is normally open, while switch 14 is normally closed. The Ferraris instrument is so arranged that disc 20 may move a limited amount. In one extreme position, pin 21 may bear against switch 13 to close the same. In the other extreme position, pin 21 may bear against switch 14 to open the same.

The torque of the disc 20 by itself is insufficient to move either switch from its normal position. However, crank arm 22, which constantly turns at a predetermined slow rate, when it goes down, will tend to move pin 21 sideways. Thus, as shown in the drawing, with crank arm 22 coming down, roller 23 will tend to push pin 21 to the left and close switch 13. Thus, the motive power for actually operating switches 13 or 14 comes from motor 19. It will be apparent that the arm 22 of the roller 23 rotates in a plane that does not contain the axis of rotation of the Ferraris disc 20. Thus the line joining the axis of the disc 20 and the pin 21 does not fall in the plane of movement of the pivot of roller 23. Accordingly, there will always be a lateral force acting on the pin 21 thereby eliminating any binding between the roller 23 and the pin 21.

As soon as switch 13, for example, is closed, a circuit through relay 15 is established, and this tends to pull movable contact 15a up against fixed contact 17. Thus, a circuit from B to 15a to contact 17 through relay winding 15 closed switch 14 down to A is established. Thus relay 15 is maintained in its closed position independently of switch 13. At the same time, the circuit to motor 18 through fixed contact 16 and movable contact 15a will be open.

Upon movement of disc 20 to place pin 21 in position to operate upon switch 14, the tendency will be for switch 14 to be opened, thus interrupting the circuit through relay 15 and closing the circuit to motor 18.

It is understood, of course, that crank arm 22 and roller 23 being continuously rotated at a slow rate will tend to push pin 21 to either an extreme left or extreme right position, as seen from the drawing. The slightest current through current coil 5 will tend to move the disc, the direction of movement depending upon the direction of unbalance in the bridge.

It is clear that, when the bridge is perfectly balanced, no difference of potential will exist between points *a* and *b*. In the event that the bridge is unbalanced in one way because of a change of resistance of resistance 6, there will be a potential difference tending to force current through the current coils. While the voltage and current are alternating, the polarity of the current coils 5 with respect to voltage coil 1 may be changed depending upon the polarity of bridge unbalance. Upon the bridge being unbalanced because of resistance 9 or 6, current through current coils 5 will flow to cause the meter to move.

Referring now to Figure 2, a differential circuit arrangement is shown wherein outside temperature responsive element 6a is connected in series with boiler temperature responsive resistance 9a. These two are connected in series with variable resistances 10a and 11a, all the resistances being connected between line A and terminal 5a of one of the two current coils of the Ferraris instrument. Terminal 5b, being common for the two current coils, is connected to line B. Terminal 5c of the remaining current coil is connected through balancing resistance 24 to line A. The Ferraris instrument relay and switch contacts are otherwise the same as in Figure 1. It will be noted that voltage coil 1 of the Ferraris instrument does not have any secondary winding.

It is clear that a potential from line A is impressed across resistance 24 and terminals 5c and 5b to B as one branch. At the same time, the same potential is impressed from line A through resistances 6a, 9a, 10a, 11a, current coil terminals 5a, 5b to line B. Assuming that the system is balanced, it is clear that the current through the two current coils will be equal and are connected to oppose each other, so that nothing will happen. However, in the event of unbalance, due to a change of resistance 6a for example, the equality through the two current coils will no longer exist and the Ferraris instrument will move in one direction. On the other hand, it is possible that a change in resistance of element 9a may unbalance the system in a reverse direction, so that the Ferraris instrument moves in the opposite direction. The switching action on motor 18 may, of course, be the same. It is understood that the Ferraris instrument is balanced to eliminate friction.

Switch 11b may be provided to shunt out resistance element 11a for changing from day to night conditions.

It is clear that the two systems are independent of voltage fluctuations and are both highly sensitive. One particular advantage resides in the fact that the system employs parts of Ferraris instruments whose manufacture and action have been well understood.

What is claimed is:

1. In an electrical apparatus adapted, in association with electric power load circuits, to regulate temperatures or other physical conditions, comprising a Ferraris watt meter, a differential resistance circuit responsive to variations in the physical condition to be regulated, and a plurality of switches operable to make and break a power load circuit, means rotatable with the driving disc of said meter and adapted to engage said switches, an operating independent source of power associated with said meter, said source of power being engageable to operate said switches through said means rotatable with said disc, whereby the sensitivity of said meter to variations in the physical condition to be regulated is unimpaired and independent of switch operating load.

2. In an electrical apparatus adapted, in association with electric power load circuits, to regulate temperatures or other physical conditions, comprising a Ferraris watt meter, a differential resistance circuit responsive to variations in the physical condition to be regulated, and a plurality of switches operable to make and break a power load circuit, means rotatable with the driving disc of said meter and adapted to engage said switches, a continuously operating independent source of power associated with said meter, said source of power being engageable to operate said switches through said means rotatable with said disc, whereby the sensitivity of said meter to variations in the physical condition to be regulated is unimpaired and independent of switch operating load.

3. An electrical control system adapted for the automatic regulation of a physical quantity, such as temperature, comprising in combination with a differential resistance circuit responsive to variations in the physical quantity to be controlled, a Ferraris watt meter having a driving disc rotatable in opposite directions in response to conditions of unbalance in said differential circuit, a switch-engaging member rotatable with said disc, switches positioned so as to be engaged by said member at the opposite limits of rotation of said disc, said switches being operable to control the making and breaking of a power load circuit to effect the regulation, a continuously operating independently energized motor associated with said meter and an auxiliary member driven by said motor and cooperating with said switch-engaging member, when said disc is at either extreme position, to actuate said switches, whereby the sensitivity of said meter for changing its position responsive to variations in the physical quantity to be controlled is unimpaired and independent of switch operating load.

4. A control system operable from an electric current supply source and adapted to regulate temperatures, comprising a Ferraris watt meter having voltage and current coils and a rotatable damping disc, said voltage coils being connected across said supply source, a differential circuit including two resistances, one resistance being adapted to vary with the temperature of a room for example, the other resistance being adapted to vary with the operating condition of a mechanism such as a boiler for heating said room, means for energizing said differential circuit from said supply source, the current coils of said watt meter being connected to said differential circuit and responsive to unbalance in said circuit, whereby to cause rotation of said disc in a direction corresponding with the direction of unbalance in said circuit, means for limiting the rotation of said disc, a plurality of switches operable to control the opening and closing of an electric power load circuit, a member rotatable with said disc for engaging one switch when said disc is at one end position and for engaging another switch when the disc is at the other end position; and independently energized, continuously operating auxiliary means for actuating said switches through said rotatable member, thereby preserving the sensitivity of said meter free from switch operating load.

5. An electrical control system operable from an alternating current supply source and adapted, in association with an electric power load circuit, to regulate temperature, as for heating purposes, and to maintain said temperature at a substantially constant value, said system comprising a Ferraris watt meter having voltage and current coils and a rotatable damping disc, said voltage coil being connected across said supply source, a bridge resistance circuit including in one arm a resistance adapted to vary with the temperature of a room for example, and in another arm a second resistance adapted to vary with the operating condition of a mechanism for heating said room, as a boiler for example, said resistance circuit having two points between which no potential difference exists when said circuit is balanced but having a potential difference therebetween on unbalance of said circuit, said current coils being connected between said two points, means for balancing said resistance circuit at a predetermined room temperature and boiler operating condition so that said two points on said circuit have no potential difference therebetween, means for limiting the rotation of said disc, a projecting member carried by said disc, switches positioned adjacent said meter, one at either end of the limits of disc rotation, and adapted to be engaged by said projecting member at the opposite rotational limits, said disc being adapted to rotate when said resistance circuit is unbalanced, with the direction of disc movement being determined by the direction of unbalance, a relay controlled by said switches, a third switch controlled by said relay, said third switch being operable to make and break a power load circuit such as a motor for effecting the regulation of boiler operating conditions to maintain the room temperature, a continuously operating synchronous motor associated with said meter and independently energized from said supply source, a rotating arm continuously driven by said synchronous motor, means carried by said rotating arm and adapted to engage said projecting member on said meter disc when said disc is at either end position, said means providing sufficient force to operate said first and second-mentioned switches, whereby the sensitivity of said meter is unimpaired and independent of switch operating load.

OTTO MAAG.

REFERENCES CITED

The following references are of record in the file of this patent:

UNITED STATES PATENTS

| Number | Name | Date |
| --- | --- | --- |
| 1,663,674 | Ytterberg | Mar. 17, 1928 |
| 1,915,050 | Coldwell | June 20, 1933 |
| 2,044,146 | Bernarde | June 16, 1936 |
| 2,065,421 | Bernarde | Dec. 22, 1936 |
| 2,079,492 | Courtin | May 4, 1937 |
| 2,135,513 | Holven | Nov. 8, 1938 |
| 2,136,559 | Miller | Nov. 15, 1938 |
| 2,313,921 | Carlin | Mar. 16, 1943 |

FOREIGN PATENTS

| Number | Country | Date |
| --- | --- | --- |
| 438,364 | Great Britain | Nov. 12, 1935 |